United States Patent
Xu

(12) United States Patent (10) Patent No.: US 9,803,895 B2
Xu (45) Date of Patent: Oct. 31, 2017

(54) REGENERATIVE REFRIGERATOR

(71) Applicant: Sumitomo Heavy Industries, Ltd., Tokyo (JP)

(72) Inventor: Mingyao Xu, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 182 days.

(21) Appl. No.: 14/668,275

(22) Filed: Mar. 25, 2015

(65) Prior Publication Data

US 2015/0276274 A1 Oct. 1, 2015

(30) Foreign Application Priority Data

Mar. 26, 2014 (JP) ................. 2014-063108

(51) Int. Cl.
| | |
|---|---|
| F25B 21/00 | (2006.01) |
| F25B 9/14 | (2006.01) |
| F28D 17/02 | (2006.01) |
| F28D 20/00 | (2006.01) |
| F25B 9/10 | (2006.01) |

(52) U.S. Cl.
CPC ............... *F25B 21/00* (2013.01); *F25B 9/14* (2013.01); *F28D 17/02* (2013.01); *F28D 20/0056* (2013.01); *F25B 9/10* (2013.01); *F25B 2309/003* (2013.01); *F25B 2321/0022* (2013.01); *Y02E 60/142* (2013.01)

(58) Field of Classification Search
CPC ..................................... F25B 9/00; F25B 9/14
See application file for complete search history.

(56) References Cited

U.S. PATENT DOCUMENTS

| | | | | |
|---|---|---|---|---|
| 6,065,295 A | * | 5/2000 | Hafner | .................... F04B 37/08 165/10 |
| 2005/0223714 A1 | * | 10/2005 | Li | .......................... F25B 9/145 62/6 |

FOREIGN PATENT DOCUMENTS

| | | |
|---|---|---|
| JP | 2013-217517 A | 10/2013 |
| WO | WO-97/31226 A1 | 8/1997 |

* cited by examiner

*Primary Examiner* — Frantz Jules
*Assistant Examiner* — Brian King
(74) *Attorney, Agent, or Firm* — Michael Best & Friedrich LLP

(57) ABSTRACT

A regenerator of a regenerative refrigerator includes: a magnetic regenerator material used for cold storage; and a container that accommodates the magnetic regenerator material. A part of the container that accommodates the magnetic regenerator material includes: a first region that includes a temperature range in which a specific heat of the magnetic regenerator material reaches maximum during an operation of the regenerative refrigerator, and a second region that is in a temperature range different from that of the first region. A cross sectional area of a part of the first region that accommodates the magnetic regenerator material is smaller than a cross sectional area of a part of the second region that accommodates the magnetic regenerator material.

5 Claims, 6 Drawing Sheets

REGENERATIVE REFRIGERATOR

RELATED APPLICATION

Priority is claimed to Japanese Patent Application No. 2014-63108, filed on Mar. 26, 2014, the entire content of which is incorporated herein by reference.

BACKGROUND OF THE INVENTION

1. Field of the Invention

The present invention relates to a regenerative refrigerator that stores the cold generated by Simon expansion of a high-pressure refrigerant gas supplied from a compressor.

2. Description of the Related Art

An exemplary regenerative refrigerator generates the cold by expanding a helium gas in an expansion chamber. The cold of the helium gas generated in the expansion chamber is stored in the regenerator and is transferred to a cooling stage, which reaches a desired cryogenic temperature and cools a cooling object connected to the cooling stage.

A regenerator material is used in a regenerator. The specific heat of a non-magnetic regenerator material such as copper is smaller than that of the refrigerant helium gas in a cryogenic temperature region of, for example, 10 K or below. Therefore, a magnetic regenerator material, which has a relatively large specific heat in a cryogenic temperature region, is used in a regenerator in that temperature region.

SUMMARY OF THE INVENTION

A purpose of the present invention is to provide a technology capable of reducing the amount of a magnetic regenerator material used, while maintaining the refrigeration capacity of the regenerative refrigerator at the same time.

According to an embodiment of the present invention, a regenerative refrigerator includes a regenerator that includes: a magnetic regenerator material used for cold storage; and a container that accommodates the magnetic regenerator material. A part of the container that accommodates the magnetic regenerator material includes: a first region that includes a temperature range in which a specific heat of the magnetic regenerator material reaches maximum during an operation of the regenerative refrigerator, and a second region that is in a temperature range different from that of the first region. A cross sectional area of a part of the first region that accommodates the magnetic regenerator material is smaller than a cross sectional area of a part of the second region that accommodates the magnetic regenerator material.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Generally, a regenerator material formed by a magnetic material cost more than a regenerator material formed by a non-magnetic material. From the perspective of reducing the cost of a regenerator and a regenerative refrigerator provided with the regenerator, the regenerative refrigerator according to an embodiment of the present invention is configured such that the cross sectional area of the part of the regenerator accommodating the magnetic regenerator material is smaller than the cross sectional area of the part accommodating the non-magnetic regenerator material.

A description will be given of embodiments of the present invention with reference to the drawings.

Figure 1:
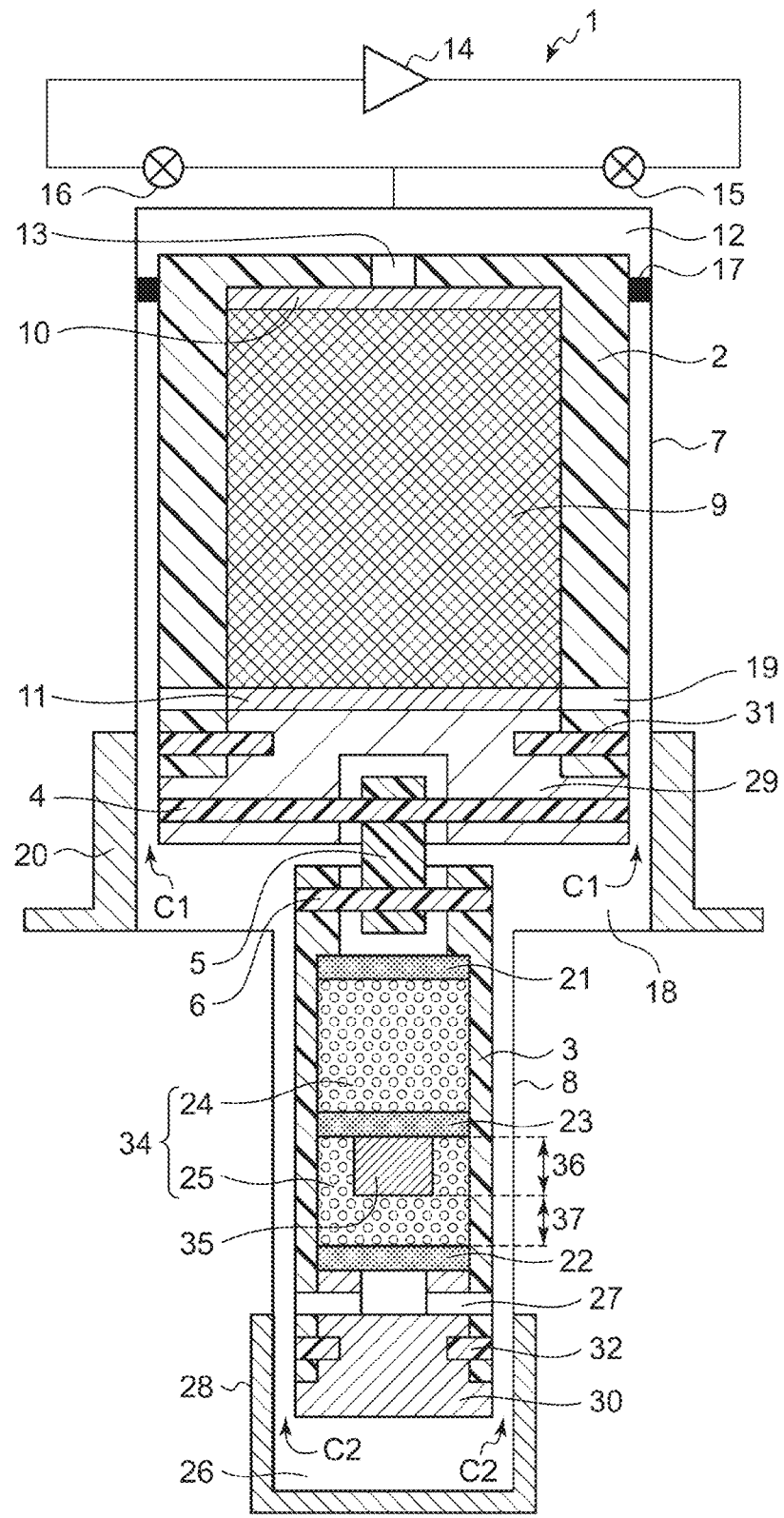
FIG. 1 schematically shows an exemplary regenerative refrigerator according to an embodiment.

FIG. 1 schematically shows an exemplary regenerative refrigerator 1 according to an embodiment. The regenerative refrigerator 1 according to an embodiment is a cryogenic refrigerator of Gifford-McMahon (GM) type in which helium gas is used as a refrigerant gas, for example. As shown in FIG. 1, the regenerative refrigerator 1 includes a first displacer 2 and a second displacer 3 connected with the first displacer 2 in the longitudinal direction. The first displacer 2 and the second displacer 3 are connected via, for example, a pin 4, a connector 5, and a pin 6.

A first cylinder 7 and a second cylinder 8 are formed so as to be integrated. Each of the first and second cylinders 7 and 8 includes a high temperature end and a low temperature end. The low temperature end of the first cylinder 7 is connected to the high temperature end of the second cylinder 8 at the bottom of the first cylinder 7. The second cylinder 8 is formed so as to extend coaxially from the first cylinder 7 and is a cylindrical member having a smaller diameter than the first cylinder 7. The first cylinder 7 is a casing that accommodates the first displacer 2 such that the first displacer 2 can reciprocate in the longitudinal direction. The second cylinder 8 is a casing that accommodates the second displacer 3 such that the second displacer 3 can reciprocate in the longitudinal direction.

For example, stainless steel is used to form the first cylinder 7 and the second cylinder 8 for reasons of strength, heat conductivity, helium shielding capability, etc. The outer circumference of the second displacer 3 is a metallic cylinder formed by, for example, stainless steel. A coating film of abrasion-resistant resin such as fluorine resin may be formed on the outer circumference of the second displacer 3.

In order to drive a reciprocating movement of the first displacer 2 and the second displacer 3, a Scotch-yoke mechanism (not shown) is mounted to the high temperature end of the first cylinder 7. The first displacer 2 and the second displacer 3 reciprocate along the first cylinder 7 and the second cylinder 8, respectively. Each of the first displacer 2 and the second displacer 3 includes a high temperature end and a low temperature end.

The first displacer 2 has a cylindrical outer circumferential surface. A first regenerator material fills a space inside the first displacer 2. The internal volume of the first displacer 2 functions as a first regenerator 9. A flow straightner 10 is mounted on the top of the first regenerator 9, and a flow straightner 11 is mounted on the bottom of the first regenerator 9. The high temperature end of the first displacer 2 is formed with a first opening 13 that guides a refrigerant gas from a room temperature chamber 12 to the first displacer 2.

The room temperature chamber 12 is a space defined by the high temperature ends of the first cylinder 7 and the first displacer 2. The room temperature chamber 12 changes its volume in association with the reciprocating movement of the first displacer 2. A common supply and discharge piping is connected to the room temperature chamber 12. The supply and discharge piping is a part of the piping system connecting components of the supply and discharge system with each other, which includes a compressor 14, a supply valve 15, and a return valve 16. A seal 17 is fitted between a portion of the first displacer 2 toward the high temperature end and a corresponding portion of the first cylinder 7.

A second opening 19 for introducing the refrigerant gas into a first expansion space 18 via a first clearance C1 is formed at the low temperature end of the first displacer 2. The first expansion space 18 is a space defined by the first cylinder 7 and the first displacer 2. The first expansion space 18 changes its volume in association with the reciprocating movement of the first displacer 2. A first cooling stage 20 thermally coupled to a cooling object (not shown) is placed at a position in the outer circumference of the first cylinder 7 corresponding to the first expansion space 18. The first cooling stage 20 is cooled by the refrigerant gas flowing through the first clearance C1.

The second displacer 3 has a cylindrical outer circumferential surface. The interior space of the second displacer 3 is divided into two stages in the axial direction, one of the stages being sandwiched by a flow straightner 21 at the upper end and a partition member 23 located in the middle in the vertical direction, and the other stage being sandwiched by the partition member 23 and a flow straightner 22 at the lower end. A high temperature region 24 in the interior volume of the second displacer 3 toward the high temperature end from the partition member 23 is filled by a second regenerator material formed by a non-magnetic material such as lead or bismuth. A low temperature region 25 toward the low temperature end (i.e., the lower stage) from the partition member 23 is filled by a third regenerator material different from that of the high temperature region 24. The third regenerator material is formed by a magnetic material such as $HoCu_2$, $Gd_2O_2S$ (GOS), etc., for example. An insertion member 35 different from the magnetic regenerator material is accommodated in the low temperature region 25. The details of the insertion member 35 will be described later.

The regenerator material such as Lead, bismuth, $HoCu_2$, GOS, etc. are formed into spheres. A plurality of spheres are aggregated to build a regenerator. The partition member 23 prevents the regenerator material in the high temperature region 24 and the regenerator material in the low temperature region 25 from being mixed. A combination of the high temperature region 24 and the low temperature region 25 (i.e., the internal volume of the second displacer 3) function as a second regenerator 34. The first expansion space 18 and the high temperature end of the second displacer 3 communicate with each other via a communication passage around the connector 5. The refrigerant gas flows from the first expansion space 18 to the second regenerator 34 via the communication passage.

A third opening 27 for introducing the refrigerant gas into a second expansion space 26 via a second clearance C2 is formed at the low temperature end of the second displacer 3.

The second expansion space 26 is a space defined by the second cylinder 8 and the second displacer 3. The second expansion space 26 changes its volume in association with the reciprocating movement of the second displacer 3. The second clearance C2 is formed by the low temperature end of the second cylinder 8 and the second displacer 3.

A second cooling stage 28 thermally coupled to a cooling object is placed at a position in the outer circumference of the second cylinder 8 corresponding to the second expansion space 26. The second cooling stage 28 is cooled by the refrigerant gas flowing through the second clearance C2.

For example, phenolic fabric is used for the first displacer 2 for reasons of specific weight, strength, heat conductivity, etc. The first regenerator material is built by, for example, a metal wire mesh. The second displacer 3 is built by using felts and metal wire meshes to sandwich the second regenerator material formed by lead or bismuth spheres in the axial direction. The internal volume of the second displacer 3 may be divided into a plurality of regions by a partition member as described above.

The first and second displacers 2 and 3 may include lids 29 and 30, respectively, at the lower temperature ends. For proper joint with the displacer body, the lids 29 and 30 have a shape of a stepped column. The lid 29 is secured to the first displacer 2 by a press-fit pin 31, and the lid 30 is secured to the second displacer 3 by a press-fit pin 32.

A description will now be given of the operation of the regenerative refrigerator 1 according to an embodiment. At a point of time during the step of supplying a refrigerant gas, the first and second displacers 2 and 3 are located at the bottom dead point of the first and second cylinders 7 and 8, respectively. When the supply valve 15 is opened concurrently or at a slightly shifted point of time, a high pressure helium gas (e.g., 2.2 MPa helium gas) is supplied from the common suction and discharge piping to the interior space of the first cylinder 7 via the supply valve 15 and flows into the first regenerator 9 in the first displacer 2 via the first opening 13 located at the top of the first displacer 2. The high pressure helium gas flowing into the first regenerator 9 is cooled by the first regenerator material and is supplied to the first expansion space 18 via the second opening 19 located at the bottom of the first displacer 2 and via the first clearance C1.

The high pressure helium gas supplied to the first expansion space 18 flows into the second regenerator 34 in the second displacer 3 via the communication passage around the connector 5. The high pressure helium gas flowing into the second regenerator 34 is cooled by the second regenerator material and is supplied to the second expansion space 26 via the third opening 27 located at the bottom of the second displacer 3 and via the second clearance.

Thus, the first expansion space 18 and the second expansion space 26 are filled with the high pressure helium gas, and then the supply valve 15 is closed. At this stage, the first and second displacers 2 and 3 are located at the top dead point of the first and second cylinders 7 and 8, respectively. By opening the return valve 16 concurrently or at a slightly shifted point of time, the pressure of the refrigerant gas in the first and second expansion spaces 18 and 26 is reduced so that the gas is expanded. The high pressure helium gas is turned into a low pressure helium gas (e.g., a 0.8 MPa helium gas). In this process, the cold is generated as a result of the expansion of the refrigerant gas. The helium gas in the first expansion space 18 cooled as a result of expansion absorbs the heat of the first cooling stage 20 via the first clearance C1. The helium gas in the second expansion space 26 absorbs the heat of the second cooling stage 28 via the second clearance C2.

The first and second displacers 2 and 3 are moved toward the bottom dead point and the volume of the first and second expansion spaces 18 and 26 is reduced. The helium gas in the second expansion space 26 is returned to the first expansion space 18 via the second clearance C2, the third opening 27, the second regenerator 34, and the communication passage. Further, the helium gas in the first expansion space 18 is returned to the suction side of the compressor 14 via the second opening 19, the first regenerator 9, and the first opening 13. In this process, the first, second, and third regenerator materials are cooled by the refrigerant gas. In other words, the first, second, and third regenerator materials store the cold generated by the expansion of the refrigerant gas. The regenerative refrigerator 1 repeats this cooling cycle described above to cool the first and second cooling stages 20 and 28.

The internal structure of the second regenerator 34 according to an embodiment will be described in further details. A description will be given below of the temperature profile (temperature slope) of the second regenerator 34 and variation of the specific heat of a magnetic regenerator material with temperature.

Figure 2:
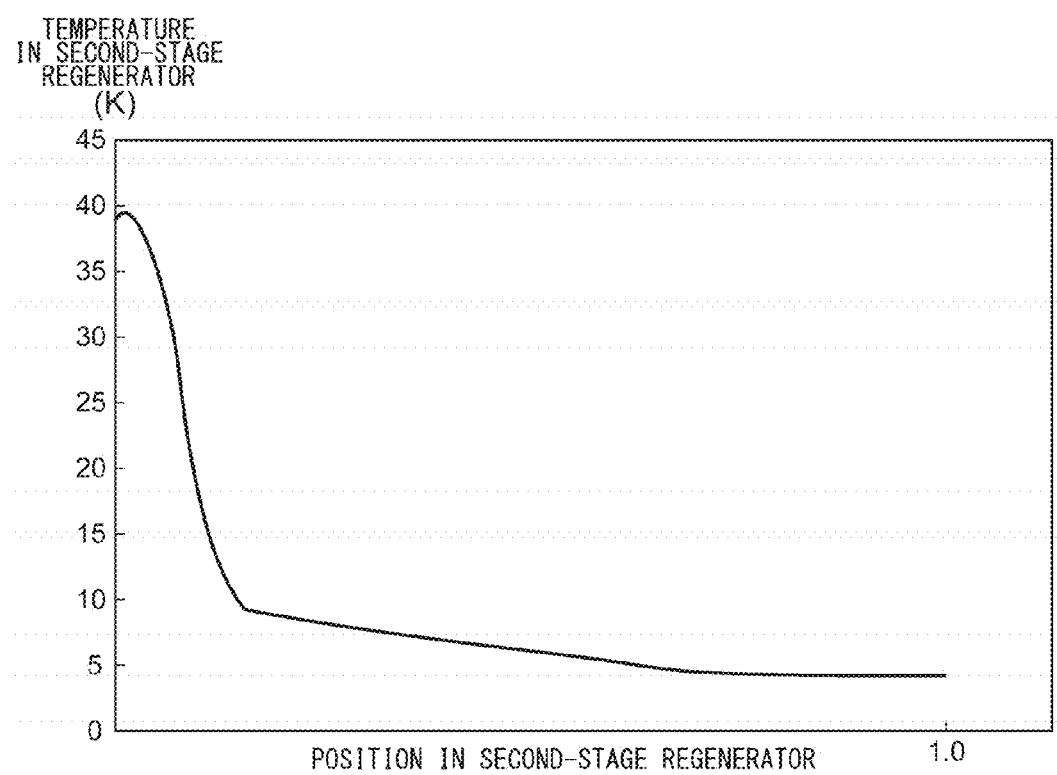
FIG. 2 shows an exemplary temperature profile of the second regenerator according to an embodiment.

FIG. 2 shows an exemplary temperature profile of the second regenerator 34 according to an embodiment. FIG. 2 is a graph showing the temperature profile of the second regenerator 34 obtained by normalizing the distance from the high temperature end of the second regenerator to the low temperature end as 1. As shown in FIG. 2, the temperature of the high temperature end (i.e., at which the normalized distance is 0) of the second regenerator 34 is about 40 K and the temperature of the low temperature end (i.e., at which the normalized distance is 1) is about 5 K, while the regenerative refrigerator 1 is in operation.

As described above, the low temperature region 25 of the second regenerator 34 is filled by the third regenerator material (e.g., a magnetic regenerator material such as $HoCu_2$, $Gd_2O_2S$ (GOS), etc.) different from that of the high temperature region 24. The low temperature region 25 is a region of the second regenerator 34 where the temperature is in a range of about 4 K-10 K.

Figure 3:
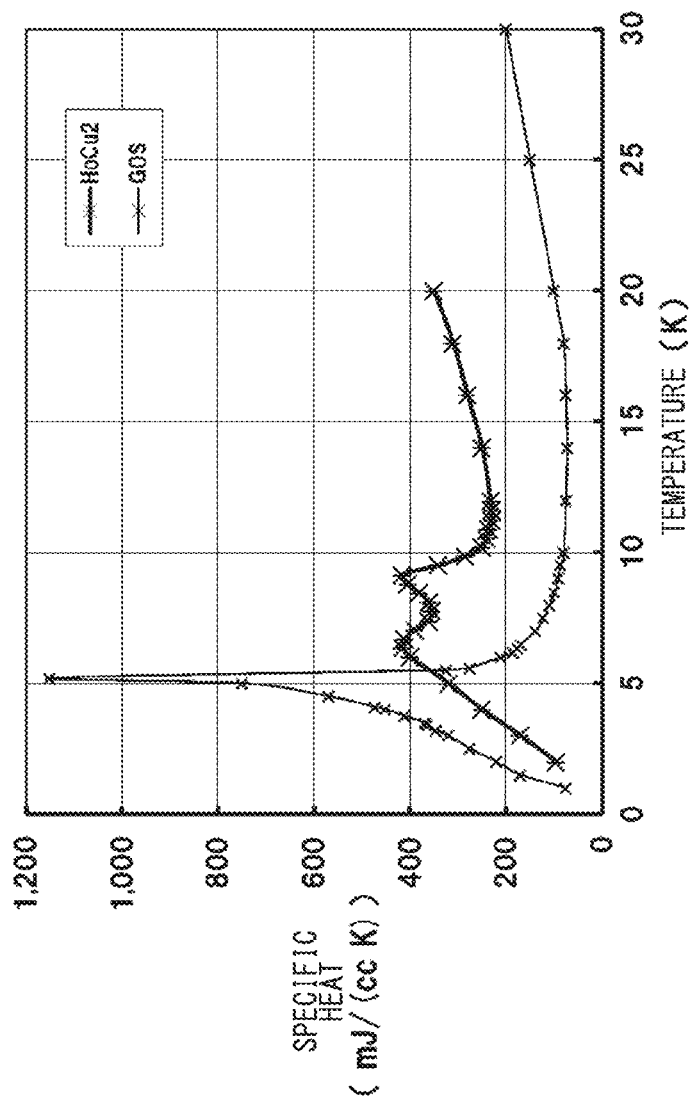
FIG. 3 is a graph showing variation of the specific heat of a magnetic regenerator material with temperature.

FIG. 3 is a graph showing variation of the specific heat of a magnetic regenerator material with temperature. More specifically, the graph shows temperature-dependent variation of the specific heat of $HoCu_2$ and GOS in a cryogenic region. As shown in FIG. 3, the specific heat peak maximum of $HoCu_2$ and GOS is observed in a temperature range of about 4 K-10 K, i.e., the temperature range of the region of the second regenerator 34 in which $HoCu_2$ or GOS is accommodated. For example, the maxima of the specific heat of $HoCu_2$ are found at the temperatures of about 6 K and about 9K. The specific heat of GOS has a very sharp peak at about 5 K.

When a refrigerant gas flows in the region filled by a magnetic regenerator material, the refrigerant gas and the magnetic regenerator material exchange heat. The larger the specific heat C of the regenerator material, the smaller the depth L of heat penetration in the magnetic regenerator material. The larger the difference $\Delta T$ between the temperature To on the surface of the magnetic regenerator material and the temperature Ti inside the magnetic regenerator material, the larger the depth L of heat penetration in the magnetic regenerator material.

The surface of the magnetic regenerator material is cooled as a result of heat exchange with the refrigerant gas. The coefficient of heat transfer h between the magnetic regenerator material and the refrigerant gas depends on the flow velocity V of the refrigerant gas. The higher the flow velocity V of the refrigerant gas, the larger the coefficient of heat transfer h.

Generally, the second regenerator 34 is a cylindrical container and the cross sectional area S thereof is uniform regardless of the axial position of the container. The magnetic regenerator material is implemented by spherical particles worked to have a substantially uniform radius. Therefore, the second regenerator 34 can be said to be a container with a uniform cross sectional area S filled by uniform spherical members. Further, the axial temperature gradient of the low temperature region 25 of the second regenerator 34 is gentle. It can therefore be said that the viscosity of the refrigerant gas in the low temperature region 25 of the second regenerator 34 is substantially equal regardless of the axial position. Accordingly, the channel resistance R encountered by the refrigerant gas in the low temperature region 25 is assumed to be uniform regardless of the axial position in the container. Consequently, the flow velocity V of the refrigerant gas flowing in the low temperature region 25 of the second regenerator 34 is uniform regardless of the position in the low temperature region 25.

If the flow velocity V of the refrigerant gas is uniform regardless of the position in the low temperature region 25 of the second regenerator 34, the coefficient of heat transfer h between the magnetic regenerator material and the refrigerant gas is substantially uniform regardless of the position in the low temperature region 25. If the coefficient of heat transfer h between the magnetic regenerator material and the refrigerant gas is uniform, the difference $\Delta T$ between the temperature To on the surface of the magnetic regenerator material and the temperature Ti inside the magnetic regenerator material is also uniform. Therefore, the depth L of heat penetration in the magnetic regenerator material is substantially uniform regardless of the position in the low temperature region 25.

If the heat penetration is not so deep, the volume of the part contributing to cold storage relative to the whole volume of the magnetic regenerator material is smaller than in the case that the heat penetration is deep. In particular, the magnetic regenerator material in a temperature range in which a peak specific heat is found has a larger specific heat C than the regenerator material in the other regions. For this reason, the depth L of heat penetration in the magnetic regenerator material accommodated in the low temperature region 25 of the second regenerator 34 is considered to be uniformly small so that only the surface layer of the magnetic regenerator material particles contributes to cold storage.

In this respect, the low temperature region 25 of the second regenerator 34 according to an embodiment is configured such that the cross sectional area S1 of the container in a region that includes a temperature range in which the specific heat of the magnetic regenerator material reaches maximum during the operation of the regenerative refrigerator 1 is smaller than the cross sectional area S2 of the container in the other temperature ranges. Hereinafter, the region of the container forming the second regenerator 34 that includes the temperature range in which the specific heat of the magnetic regenerator material reaches maximum during the operation of the regenerative refrigerator 1 will be referred to as "first region 36" for convenience. The region of the container forming the second regenerator 34 outside the temperature range in which the specific heat of the magnetic regenerator reaches maximum during the operation of the regenerative refrigerator 1 will be referred to as "second region 37". In other words, the cross sectional area of the container in the first region 36 is S1, and the cross sectional area of the container in the second region 37 is S2.

Referring to FIG. 1, the region of the second regenerator 34 in which the insertion member 35 is accommodated is the first region 36. The insertion member 35 is formed of a substance such as phenol resin or metal that is impermeable to the refrigerant gas. Therefore, by inserting the insertion member 35 in the first region 36, the cross sectional area S1 of the container in the first region 36 can be substantively reduced. Since the flow rate of the refrigerant gas flowing in the second regenerator 34 is uniform regardless of the position in the container, the flow velocity V of the refrigerant gas is inversely proportional to the cross sectional area S of the container. Therefore, the flow velocity V1 of the refrigerant gas flowing in the first region 36 is higher than the flow velocity V2 of the refrigerant gas flowing in the second region 37.

By increasing the flow velocity V1 of the refrigerant gas in the first region 36, the coefficient of heat transfer h1 between the magnetic regenerator material and the refrigerant gas in the first region 36 is also increased. The higher the coefficient of heat transfer h1 between the magnetic regenerator and the refrigerant gas, the more efficiently the surface of the magnetic regenerator material is cooled by the refrigerant gas. Therefore, the temperature To1 on the surface of the magnetic regenerator material particles in the first region 36 is lower than the temperature in the absence of the insertion member 35. Therefore, the difference $\Delta T1$ between the temperature To1 on the surface of the magnetic regenerator material particles and the temperature Ti1 inside the magnetic regenerator material particles in the first region 36 is larger than the difference in the absence of the insertion member 35. Consequently, the depth L1 of heat penetration in the magnetic regenerator material particles in the first region 36 is larger than the depth in the absence of the insertion member 35. In other words, insertion of the insertion member 35 increases the volume of the part of the magnetic regenerator material particles in the first region 36 that contributes to cold storage.

It should be noted that insertion of the insertion member 35 in the first region 36 results in reduction of the volume of the magnetic regenerator material that can fill the first region 36 by an amount defined by the volume of the insertion member 35. Generally, reduction in the volume of the magnetic regenerator material in the regenerative refrigerator 1 results in reduction in the refrigeration capacity of the regenerative refrigerator 1. However, the magnetic regenerator material accommodated in the temperature range in which the specific heat C of the magnetic regenerator material reaches a peak is not considered to fully exhibit its cold storage capability due to the small depth L of heat penetration resulting from the large specific heat C. This means that the performance of the regenerative refrigerator 1 can be maintained even if the volume of the magnetic regenerator material is reduced, by allowing the magnetic regenerator material accommodated in the temperature range in which the specific heat C of the magnetic regenerator material reaches a peak to fully exhibit its cold storage capability.

The second regenerator 34 according to an embodiment is designed to improve the cold storage capability of the magnetic regenerator material by increasing the flow velocity V1 of the refrigerant gas flowing in the first region 36 by inserting the insertion member 35 in the first region 36. Consequently, the amount of the magnetic regenerator material used can be reduced but the refrigeration capacity of the regenerative refrigerator 1 is maintained at the same time. Further, the cross sectional area S1 of the container in the first region 36 is reduced by inserting the insertion member 35 in the first region 36 so that there is no need to change the shape of the second regenerator 34 itself. Thus, the second regenerator 34 according to the related art can be still usable so that the manufacturing cost of the regenerative refrigerator 1 is prevented from growing.

FIG. 1 shows a case where the magnetic regenerator material accommodated in the low temperature region 25 of the second regenerator 34 is $HoCu_2$. As shown in FIG. 3, the maxima of the specific heat of $HoCu_2$ are found at the temperatures of about 6 K and about 9K. It is therefore preferable that the first region 36 in the low temperature region 25 of the second regenerator 34 be in a temperature range of 5-10 K during the operation of the regenerative refrigerator 1. This increases the depth L of heat penetration in $HoCu_2$ and so maintains the refrigeration capacity as a result, in spite of the fact that the amount of $HoCu_2$ that can fill the first region 36 is reduced due to the insertion of the insertion member 35 in the first region 36. Accordingly, the amount of the magnetic regenerator material used can be reduced but the refrigeration capacity of the regenerative refrigerator 1 is maintained at the same time.

Figure 4:
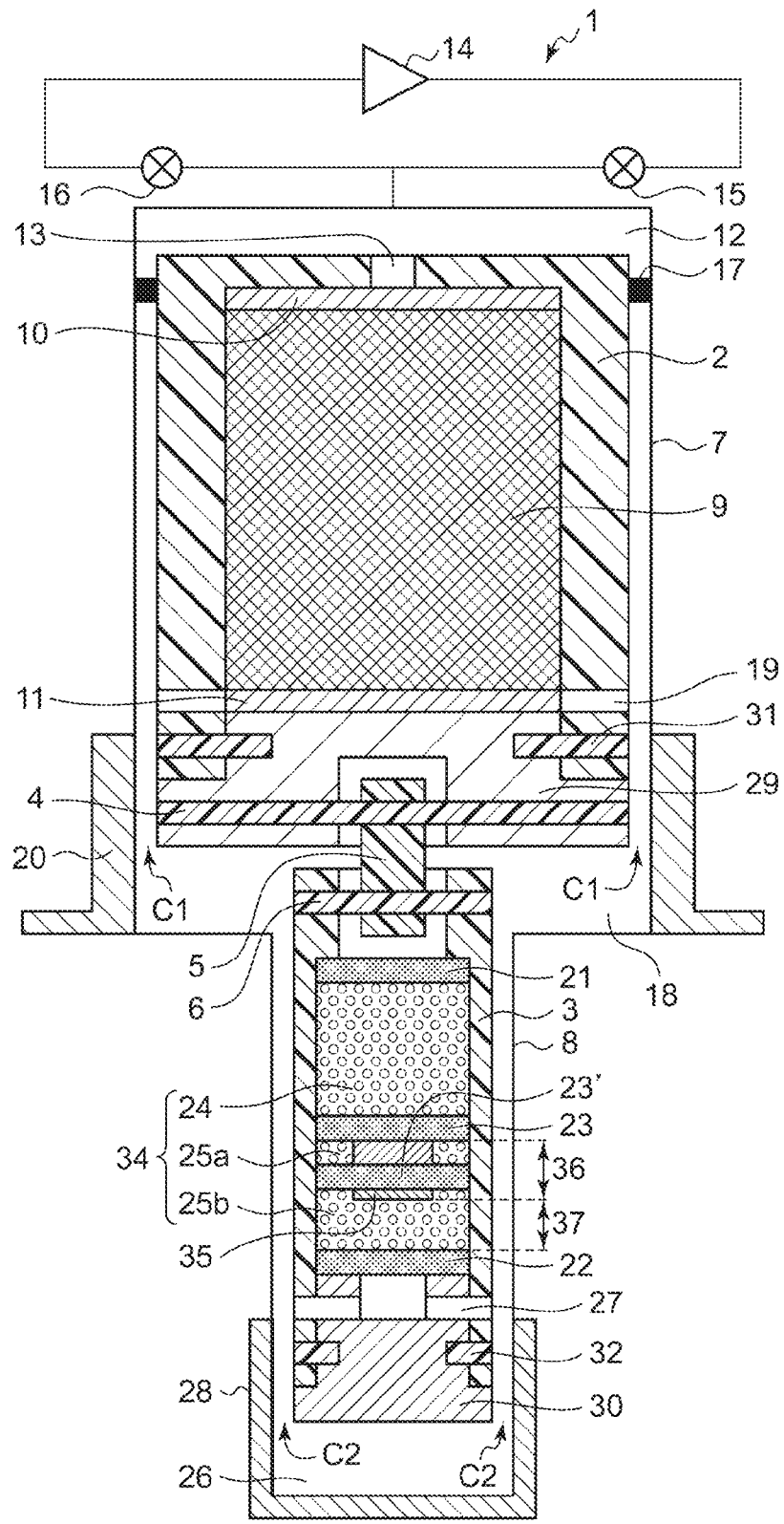
FIG. 4 is schematically shows a case where two types of magnetic regenerator materials are accommodated in the low temperature region of the second regenerator.

FIG. 4 shows a case where the two types of magnetic regenerator materials formed by $HoCu_2$ and GOS respectively are accommodated in the low temperature region 25 of the second regenerator 34. As compared to the case shown in FIG. 1, the number of types of magnetic regenerator materials is increased so that a partition member 23' is inserted in the low temperature region 25 to segment the low temperature region 25 into a first low temperature region 25a and a second low temperature region 25b. Referring to FIG. 4, $HoCu_2$ fills the first low temperature region 25a and GOS fills the second low temperature region 25b. The specific heat C of $HoCu_2$ reaches maximum at about 6 K and at about 9 K so that it is preferable that the first low temperature region 25a be in a temperature range of 5 K-10 K during the operation of the regenerative refrigerator 1.

As shown in FIG. 3, the specific heat C of GOS reaches maximum at about 5 K. It is therefore preferable that GOS is in a temperature range 4.5 K-5.5 K during the operation of the regenerative refrigerator 1 so that 5 K is included. Based on the foregoing, it is preferable that the first region 36 be in a temperature range of 4.5 K-10 K. This ensures that the specific heat C of $HoCu_2$ and GOS included in the magnetic regenerator material reaches maximum in the first region 36. Since the flow velocity V1 of the refrigerant gas in the first region 36 is increased due to the insertion member 35, the depth L of heat penetration in $HoCu_2$ and GOS is increased so that the refrigeration capacity is consequently maintained even if the volume of the magnetic regenerator material is reduced. The first region 36 includes the first low temperature region 25a and a part of the second low temperature region 25b.

As described above, the regenerative refrigerator 1 allows the amount of the magnetic regenerator material used to be reduced, while maintaining the refrigeration capacity of the regenerative refrigerator 1 at the same time.

Preferred embodiments of the invention are described above in detail. The embodiments are not limited to those described above and various modifications or replacements of the embodiments are possible without departing from the scope of the invention.

Described above is a case in which the cross sectional area S1 is reduced by inserting the insertion member 35 in the first region 36 of the second regenerator 34 of the regenerative refrigerator 1. However, the method of reducing the cross sectional area S1 of the first region 36 is not limited to the method described above.

Figure 5:
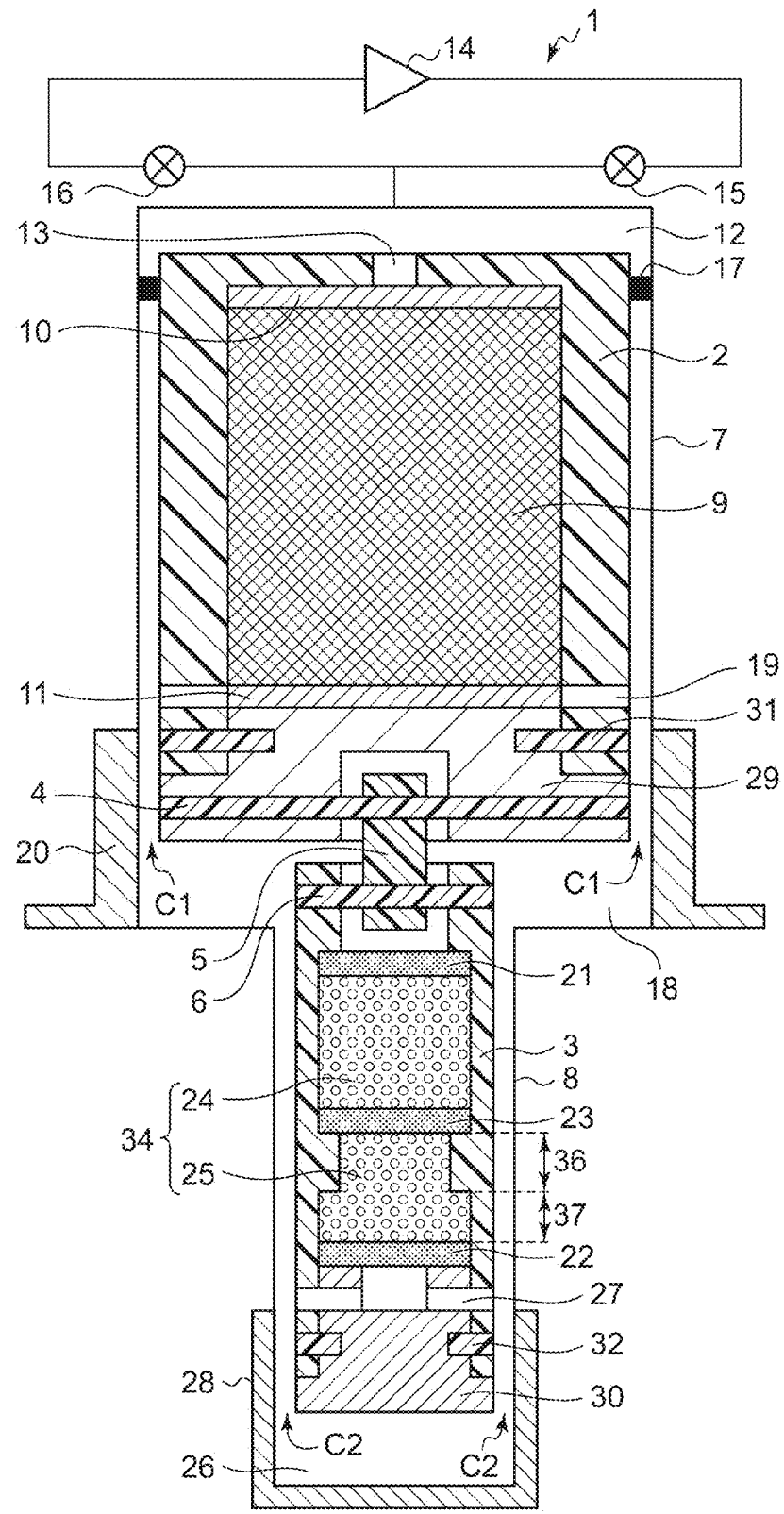
FIG. 5 schematically shows an exemplary regenerative refrigerator according to a first variation.

FIG. 5 schematically shows an exemplary regenerative refrigerator 1 according to a first variation in which the magnetic regenerator material accommodated in the low temperature region 25 of the second regenerator 34 is formed by $HoCu_2$. As shown in FIG. 5, the insertion member 35 is not inserted in the second regenerator 34 of the regenerative refrigerator 1 according to the first variation. Instead, the lateral wall of the second regenerator 34 according to the first variation aligned with the first region 36 is thicker than elsewhere so that the cross sectional area S1 of the container is smaller accordingly. This reduces the amount of $HoCu_2$ that can fill the first region 36 but increases the depth L of heat penetration in $HoCu_2$ because the flow velocity V1 of the refrigerator gas flowing in the first region 36 is increased. Consequently, the refrigeration capacity of the regenerative refrigerator 1 is maintained despite the reduction in the amount of the magnetic regenerator material.

Figure 6:
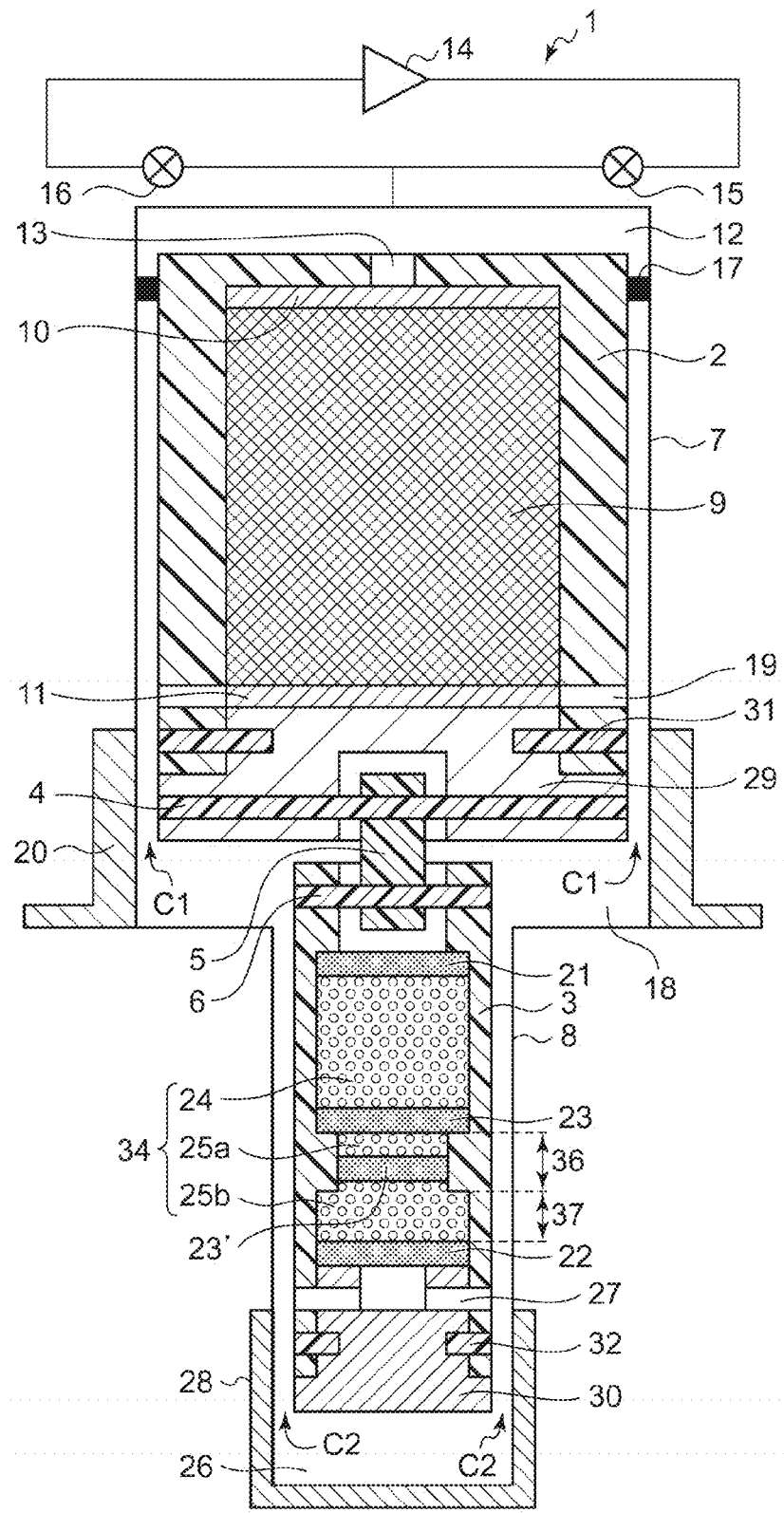
FIG. 6 schematically shows an exemplary regenerative refrigerator according to a second variation.

FIG. 6 schematically shows an exemplary regenerative refrigerator 1 according to a second variation, in which two types of magnetic regenerator materials formed by $HoCu_2$ and GOS respectively are accommodated in the low temperature region 25 of the second regenerator 34. In the example shown in FIG. 6, as in the example shown in FIG. 4, the partition member 23' segments the low temperature region 25 into the first low temperature region 25a and the second low temperature region 25b.

The first low temperature region 25a is filled by $HoCu_2$. The second low temperature region 25b is filled by GOS. The first region is defined by the first low temperature region 25a and a part of the second low temperature region 25b adjacent to the partition member 23'. As in the example shown in FIG. 5, the lateral wall of the second regenerator 34 of the regenerative refrigerator 1 shown in FIG. 6 aligned with the first region 36 is thicker than elsewhere so that the cross sectional area S1 of the container is smaller accordingly. This reduces the amount of $HoCu_2$ and GOS that can fill the first region 36 but increases the depth L of heat penetration in $HoCu_2$ and GOS because the flow velocity V1 of the refrigerant gas flowing in the first region 36 is increased. Consequently, the refrigeration capacity of the regenerative refrigerator 1 is maintained despite the reduction in the amount of the magnetic regenerator material.

The two-stage regenerative refrigerator 1 is described above by way of example. Alternatively, the refrigerator may include three or more stages. The regenerative refrigerator 1 according to an embodiment is described as being a GM refrigerator of displacer type, but the description is non-limiting as to the type of refrigerator. For example, the embodiments can be applied to GM refrigerators of pulse tube type, Stirling refrigerators, Solvay refrigerators, etc.

It should be understood that the invention is not limited to the above-described embodiment, but may be modified into various forms on the basis of the spirit of the invention. Additionally, the modifications are included in the scope of the invention.

What is claimed is:

1. A regenerative refrigerator comprising:
    a regenerator that includes:
        a magnetic regenerator material used for cold storage; and
        a container that accommodates the magnetic regenerator material,
    wherein a part of the container that accommodates the magnetic regenerator material includes:
        a first region that includes a temperature range in which a specific heat of the magnetic regenerator material reaches maximum during an operation of the regenerative refrigerator, and a second region that is in a temperature range different from that of the first region, the first region divided from the second region in an axial direction of the regenerator, and
        a first cross sectional area of a part of the first region that accommodates the magnetic regenerator material is smaller than a second cross sectional area of a part of the second region that accommodates the magnetic regenerator material, the first cross sectional area and the second cross sectional area being perpendicular to the axial direction of the regenerator.

2. The regenerative refrigerator according to claim 1, wherein an insertion member different from the magnetic regenerator material is accommodated in the first region of the container.

3. The regenerative refrigerator according to claim 1, wherein
    the magnetic regenerator material includes $HoCu_2$, and
    the first region is in a temperature range of 5 K-10 K during an operation of the regenerative refrigerator.

4. The regenerative refrigerator according to claim 1, wherein
    the magnetic regenerator material includes $Gd_2O_2S$, and
    the first region is in a temperature range of 4.5 K-5.5 K during an operation of the regenerative refrigerator.

5. The regenerative refrigerator according to claim 1, wherein the magnetic regenerator material includes $HoCu_2$ and $Gd_2O_2S$, and the first region is in a temperature range of 4.5 K-10 K during an operation of the regenerative refrigerator.

* * * * *